United States Patent [19]

Murata et al.

[11] 4,053,733
[45] Oct. 11, 1977

[54] TEMPERATURE CONTROL DEVICE

[75] Inventors: Tomoji Murata; Masayuki Maese, both of Toyokawa, Japan

[73] Assignee: Minolta Camera Kabushiki Kaisha, Osaka, Japan

[21] Appl. No.: 596,243

[22] Filed: July 16, 1975

[30] Foreign Application Priority Data

Aug. 6, 1974 Japan ................................ 49-90438
Apr. 30, 1975 Japan ................................ 50-52697

[51] Int. Cl.² .......................................... G05D 23/24
[52] U.S. Cl. ..................................... 219/494; 219/506
[58] Field of Search .............. 219/490, 494, 497, 499, 219/501, 504, 505, 506; 323/18, 24, 19; 307/252 UA

[56] References Cited

U.S. PATENT DOCUMENTS

| 3,577,177 | 5/1971 | Hewlett | 323/2.5 |
| 3,678,247 | 7/1972 | Sawa et al. | 219/499 X |
| 3,819,960 | 6/1974 | Kohn | 219/501 X |
| 3,821,516 | 6/1974 | Hayes | 219/497 |
| 3,838,248 | 9/1974 | Uchida et al. | 219/499 X |
| 3,946,199 | 3/1976 | Nakamura | 219/499 |

OTHER PUBLICATIONS

RCA Solid State Div., "Linear Integrated Circuits Appl. Notes" Geo. Goanieri, pp. 1-12, Mar. 1970.

Primary Examiner—William H. Beha, Jr.
Attorney, Agent, or Firm—Wenderoth, Lind & Ponack

[57] ABSTRACT

A temperature control device in which electric power to be supplied to a heating element is controlled correspondingly to pulse intervals applied to a switch circuit with the pulse intervals adapted to vary according to the temperature of the portion to be heated by the heating element, which temperature control device is further provided with a sensor for detecting the pulse intervals when the temperature of the portion to be heated has reached a predetermined level with the signal from the sensor being utilized as the signal for the completion of warming-up of the portion to be heated.

14 Claims, 28 Drawing Figures

TEMPERATURE CONTROL DEVICE

The present invention relates to a temperature control device, and, more particularly, to a temperature control device for use, for example, in a heating apparatus employing an electric heating means or the like.

Conventionally, in a heating apparatus of the above described type used, for example, for fixing a developed toner powder image onto a copy paper sheet in a known electrophotographic copying machine, a temperature control device having a known zero-crossing temperature control circuit for an A.C. power source is employed, in which prior art zero crossing temperature control circuit, on-off control or proportional control is generally used. However, such a conventional temperature control device has serious disadvantages in that, the on-off control method has only rough controlling accuracy although it has a simple construction, while the proportional control method inevitably requires a complicated control device in spite of the high control accuracy thereof.

Commonly, in the heating apparatus for fixing a toner powder image of the above described type, predetermined optimum temperatures in the range of approximately 100° to 200° C are required, and in bringing such a fixing device into operative condition, the fixing device must first be "warmed up", i.e., the temperature of the fixing device must be raised from room temperature level to a predetermined optimum level. Since insufficient fixing results in unclear copied images, to prevent a printing operation from being carried out before the temperature of the fixing device reaches the predetermined high level, it is necessary for the copying apparatus to be provided either with locking means for preventing a printing operation during such "warming-up time", or indication means for drawing the attention of the operator to the condition of the machine, for which purpose a temperature control device having detection means for detecting the completion of such "warming-up" is required.

In the conventional temperature control device of the above described type, it has been a general practice to provide, besides a temperature sensor element for the temperature control of the heating device to heat the fixing device, a thermostat for detecting completion of the "warming-up" or a temperature sensor element such as a thermistor. However, such conventional temperature detecting method has also various disadvantages that not only is the cost of the device increased since two temperature sensors are required, but, due to the difference in characteristics between the two temperature sensors, the temperature sensor for detecting the completion of the "warming-up" may not detect such completion even when the temperature control circuit has already reached the predetermined optimum level, or vice versa, and that it is very difficult to match the characteristics of both temperature sensors and to bring the functioning time of the same into agreement with each other.

Accordingly, an essential object of the present invention is to provide a temperature control device for use in a heating apparatus which has a simple circuit construction employing a small number of temperature sensor elements with substantial elimination of the disadvantages inherent in the conventional temperature control devices.

Another important object of the present invention is to provide a temperature control device of the above described type which is accurate in functioning for efficient control of temperature level.

A further object of the present invention is to provide a temperature control device of the above described type which can be manufactured at low cost.

According to a preferred embodiment of the present invention, the temperature control device includes a zero-crossing temperature control circuit which comprises a zero-crossing point detection circuit for generating pulse signals at the zero-crossing time of an A.C. power source, an integration circuit for integrating control input signals, a comparison circuit which receives, as an input thereto, the outputs of said zero-crossing point detection circuit and said integrating circuit, and which produces an output of zero-crossing signals after the integrated value of said integrating circuit has exceeded a predetermined value, and switch means for passing a half cycle of the A.C. power source through the output of said comparison circuit, by which arrangement the circuit construction is simplified to a great extent with resultant low cost, and comparatively accurate control of electric power can be effected. Furthermore, in the temperature control device of the type wherein electric power to be supplied to a heating apparatus is controlled according to pulse intervals impressed on switch means with said pulse intervals adapted to vary depending on the temperature of a portion to be heated by said heating apparatus, means for detecting the pulse intervals when the temperature of the portion to be heated has reached a predetermined level is provided and the signals from said detecting means are advantageously utilized as completion signals to indicate completion of "warming-up", by which arrangement the necessity for a separate temperature sensor element is dispensed with, thus resulting in simplification of the circuit construction and reduction in manufacturing cost.

These and other objects and features of the present invention will become apparent from the following description taken in conjunction with the preferred embodiment thereof with reference to the accompanying drawing, in which;

FIGS. 9(A) through 10(E) illustrate wave forms and pulse intervals explanatory of the operation of the device of FIG. 8.

Before the description of the present invention proceeds, it is to be noted that like parts are designated by like numerals throughout several views of the accompanying drawings.

Figure 1:
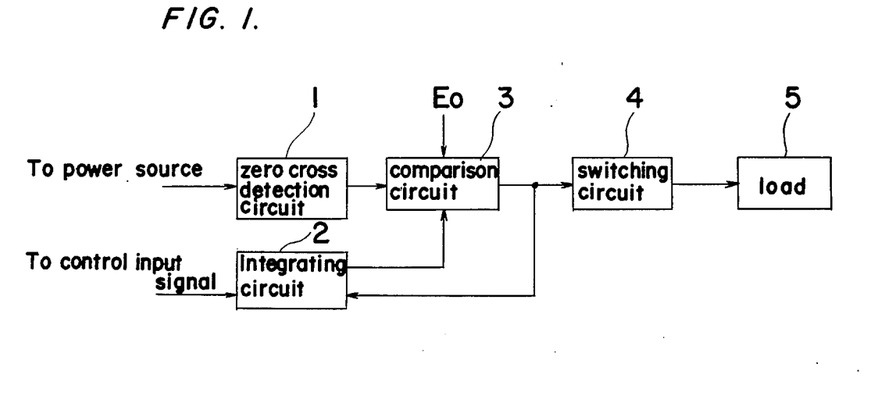
FIG. 1 is an electrical block diagram of a temperature control device according to one embodiment of the present invention.
Figure 2:
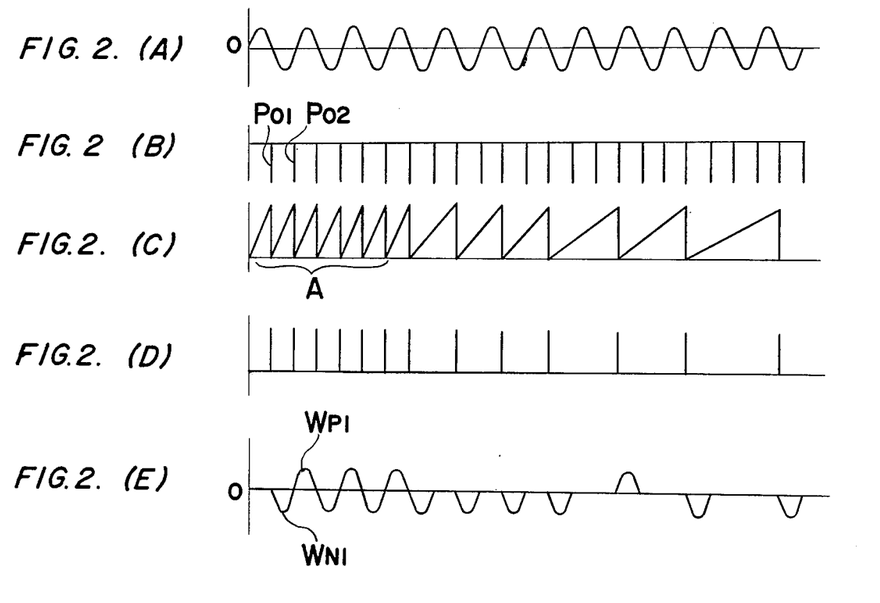
FIGS. 2(A) through 2(E) illustrate wave forms and pulse intervals explanatory of the operation of the device of the present invention.

Referring now to FIGS. 1 to FIG. 4(C), there is shown in FIG. 1 an electrical block diagram of a temperature control device of the invention which generally comprises a zero-crossing point detection circuit 1 for detecting zero-crossing points of an A.C. power source, an integrating circuit 2 on which a control input voltage is impressed for integrating said control input voltage therein, both of which circuits 1 and 2 are coupled to a comparison circuit 3 for comparing zero-crossing signals from the zero crossing point detection circuit 1 with the integrated voltage from the integration circuit 2, and a switching circuit 4 connected between the comparison circuit 3 and a load 5, a common junction of the comparison circuit 3 and the switching circuit 4 being further connected to the integrating circuit 2. The zero crossing point detection circuit 1 produces pulses as shown in FIG. 2(B) every time the A.C. voltage as in FIG. 2(A) passes the zero crossing point. The increasing rate of the output voltage from the integrating circuit 2 is proportional to the control input voltage, i.e., the output voltage from the integrating circuit 2 reaches a predetermined voltage value Eo at speeds proportional to the magnitude of the control input voltage. The comparison circuit 3 compares the zero crossing pulses from the detection circuit 1 with the integrated voltage from the integrating circuit 2 and produces output pulses as shown in FIG. 2(D) in synchronization with the zero crossing signals generated after the integrated voltage has exceeded the predetermined value Eo. As is clear from FIG. 2(D), the intervals between the output pulses of the comparison circuit 3 become short when the control input voltage is high, while the same become long as the control input voltage decreases, and upon development of the output pulses from the comparison circuit 3, the integrated voltage of the integrating circuit 2 is reset at zero. The switching circuit 4, for example, a triac inserted between the A.C. power source and the load 5 is triggered by the output pulses from the comparision circuit 3 and supplies to the load 5 half a cycle of the A.C at the time when said output pulses are impressed thereon.

By this arrangement, when the control input voltage is high, the output voltage of the integrating circuit 2 rises in steep slopes as shown at the portion A of FIG. 2(C) and reaches the predetermined value Eo by the time when the half cycle of the A.C. power source is completed with the output voltage subsequently being impressed upon the comparison circuit 3, which comparison circuit 3 develops output pulses from a zero crossing signal P$o1$ after the half cycle of the A.C. power source has been completed. The output pulses thus developed turn on the switching circuit 4 which in turn supplies the load 5, for example, with a negative half cycle $W_{Nl}$ of the A.C. current as shown in FIG. 2(E), while the same output pulses also re-set the integrating circuit 2, which again begins to integrate the control input voltage starting from zero.

If the magnitude of the control input voltage is the same as that in the case as described above, the integrated value of the integrating circuit 2 reaches the predetermined value Eo at the time when a zero crossing signal P$o2$ (FIG. 2(B)) is developed at an initial stage of a positive half cycle $W_{Pl}$ of the A.C. current with the switching circuit 4 again being turned on and with a subsequent positive half cycle $W_{Pl}$ supplied to the load 5, thus similar operations to those described above being repeated for supplying the load 5 with a continuous full wave A.C. power.

When the control input voltage decreases, the inclination of the output voltage rise of the integrating circuit 2 becomes gentle and the output voltage from the circuit 2 reaches the predetermined value Eo only when the half cycle of the A.C. power has been completed. Accordingly, the pulse intervals from the comparison circuit 3 correspondingly widen, and if the same become widened to such an extent that the output pulse is generated at the rate of full pulse per one cycle, the switching circuit 4 is turned on at every half cycle for supplying power $W_{N2}$, $W_{N3}$ and so on to the load 5, by which function, the power to be supplied to the load 5 is decreased to half. In a similar manner to that described above, the intervals of the pulses produced by the comparison circuit 3 are lengthened as the control input voltage decreases, with the load 5 being supplied with voltages at intervals of 1, 1½, 2, 2½, 3 cycles and so on.

Figure 3:
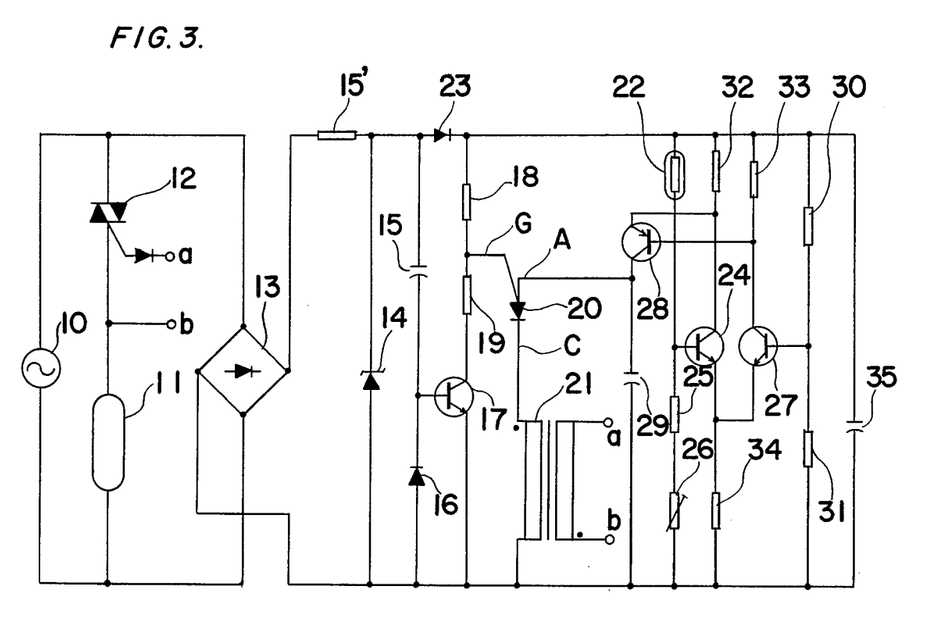
FIG. 3 is an electrical circuit diagram showing the construction of a temperature control circuit of the device of FIG. 1, FIG. 4(A) through 4(C) illustrate wave forms explanatory of zero-crossing pulse generaton in the circuit of FIG. 3.
Figure 4:
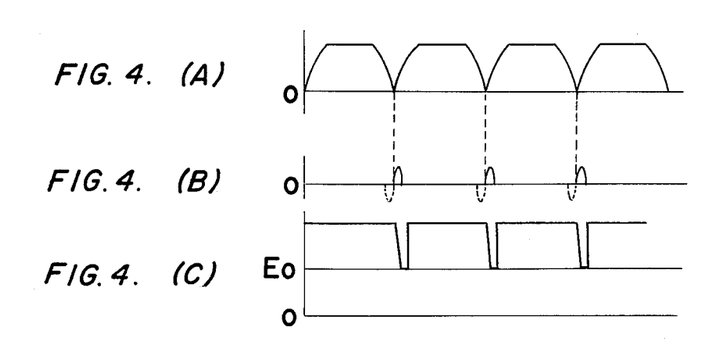

Referring now to FIG. 3, there is shown an electrical circuit diagram of the temperature control device of FIG. 1, in which diagram, a heater 11 to be provided in a suitable heating apparatus (not shown) is connected to an A.C. power source 10 through a triac 12 (three electrode A.C. control element). The output terminals of a rectifier circuit 13 coupled across the power source 10 for rectifying the A. C. current from the power source 10 into full pulsating current output are connected to a voltage regulator diode for example, a Zener diode 14 through a resistor 15' so as to obtain, across the diode 14, trapezoidal waves in the form of a truncated full wave pulsating current as shown in FIG. 4(A). A capacitor 15 and a diode 16 connected in series are connected to opposite sides of the Zener diode 14 with the common junction of the capacitor 15 and the diode 16 being connected to the base of a transistor 17, thus the capacitor 15 and the transistor 17 forming a differentiation circuit for producing differential pulses as shown in FIG. 4(B) in the base of the transistor 17 at the rise of the trapezoidal wave form of FIG. 4(A). It should be noted, however, that the portions shown in dotted lines in FIG. 4(B) do not actually appear, since the same portions are cut off by the presence of the voltage regulator diode 14. The transistor 17 is momentarily rendered conducting by the differential pulses with the collector voltage of said transistor 17 being reduced to approximately zero, thereby developing zero crossing signals as shown in FIG. 4 (C) at a common junction of series connected resistors 18 and 19 which are connected to the collector circuit of the transistor 17, while at the same time, the comparison voltage Eo is determined by the resistors 18 and 19. The gate G of a programmable uni-junction transistor 20 (hereinbelow referred to as PUT) is connected to one end of the resistor 19 at the common junction of the resistors 19 and 18, while the cathode C of the PUT 20 is connected to a primary side terminal of a pulse transformer 21 for generating pulses for rendering the triac 12 conducting. The terminals a and b of the secondary side of the pulse transformer 21 are respectively connected to the gate and cathode of the triac 12. A thermistor 22 is provided adjacent to the heater 11 for detecting the temperature of the heating apparatus (not shown) to be heated by the heater 11. One terminal of the thermistor 22 is connected to the output terminal of the rectifier 13 through a diode 23 and the resistor 15' for being supplied with the D.C. power, while the other terminal of the same thermistor 22 is coupled to the base of a transistor 24 which constitutes a differential amplifier together with a transistor 27, and is further connected to the other terminal of the D.C. power source 13, through resistors 25 and 26. The base of the transistor 27 forming part of the differential amplifier is connected to a common junction of series connected resistors 30 and 31 for being constantly biased through said resistors 30 and 31. Output of the differential amplifier is taken out through the collectors of the transistors 24 and 27, and the emitter of a constant-current source transistor 28 is connected to the collector of the transistor 24, while the base of the transistor 28 is coupled to the collector of the transistor 27 with the collector of the transistor 28 being connected to the anode A of the PUT 20 and also to one end of an integrating capacitor 29. A resistor 32 is connected to the collector of the transistor 24 with a resistor 33 connected to the collector of the transistor 27, while a resistor 34 is coupled to a common junction of the emitters of the transistors 24 and 27 of the differential amplifier, the resistor 32 particularly serving for setting the output current to a proper value. A smoothing capacitor 35 is connected across the series connected resistors 30 and 31.

By this arrangement, the zero crossing pulses are developed at the gate G of the PUT 20 every time the voltage of the A.C. power source 10 is reduced to zero. When the temperature of the heating apparatus (not shown) is much lower than the desired value, the resistance value of the thermistor 22 is at a high level and the base potential of the transistor 24 is low, whereby the collector current thereof is reduced and the collector potential thereof is increased.

Accordingly, the emitter potential of the transistor 27 drops to a low level and the base current of the transistor 27 flows through the resistor 30, thus the collector voltage thereof being reduced and current also flowing through the collector. The emitterbase voltage of the transistor 28 is thereby increased and current flows through the collector thereof, which current charges the capacitor 29 connected to the collector of said transistor 28. Since the base voltage of the transistor 28 is held constant correponding to the base voltage of the transistor 27 divided by the resistors 30 and 31, with the emitter voltage of the transistor 28 being maintained at a constant value corresponding to the resistance value of the thermistor 22, the voltage across the emitter resistance 32 of the transistor 28 is also constant, and the capacitor 29 is charged by a constant current corresponding to the resistance value of the thermistor 22 irrespective of the voltage of the capacitor 29. Therefore, the voltage of the capacitor 29 rapidly increases linearly, which voltage is applied to the anode A of the PUT 20, and when the zero crossing signals impressed upon the gate G of the PUT 20 after said voltage has exceeded the gate voltage of the PUT 20, i.e., the value of the voltage divided by the resistors 18 and 19, the PUT 20 oscillates and this current flow through the pulse transformer 21, whereby the triac 12 is turned on or rendered conducting for supplying half cycles of the A.C. current to the heater 11. The conduction by the PUT 20 discharges the capacitor 29, which is again charged from a zero voltage level.

The operation described above is repeated, and the triac 12 is made conducting at every half cycle, and consequently the heater 11 is continuously supplied with the full wave A.C. current.

When the temperature of the heating apparatus (not shown) is raised due to heating by the heater 11, the resistance of the thermistor 22 is lowered and the base potential of the transistor 24 is raised, and when the emitter current of the same transistor 24 is thus increased, thereby the collector voltage of the transistor 24 and also the emitter voltage of the transistor 28 are lowered. The emitter voltage of the transistor 27 is raised by the rise of the emitter voltage of the transistor 24, with a consequent decrease of the collector current and an increase of the collector voltage of the transistor 27, and the base voltage of the transistor 28 is also raised. Therefore, the emitter current of the transistor 28 is reduced with a consequent reduction of the charging speed of the capacitor 29. Acordingly, the voltage across the capacitor 29 fails to reach the gate voltage of the PUT 20 during the half cycle period of the A.C. power, reaching said gate voltage before the next cycle after the half cycle has been completed, due to which fact, the PUT 20 is not made conducting even if the zero crossing signal at the completion of the initial half cycle is applied thereto, and is turned on only by the zero crossing signal at the subsequent half cycle. Accordingly, the triac 12 is rendered conducting only at each full cycle, and thus the electric power supplied to the heater 11 is reduced to ½ of the above described case.

As the resistance of the thermistor 22 decreases with a further increase of the temperature, the conducting period of the triac 12 is further reduced and the impressed power is gradually decreased with the electric power being applied to the heater 11 at intervals of 1½, 2, 2½, 3 cycles and so on.

As is seen from the foregoing description, according to the temperature control device of the invention, the circuit construction is greatly simplified, merely comprising the integrating circuit for integrating the control input signal, the zero crossing signal generating circuit, and the comparison circuit for controlling conduction of the A.C. switch by the zero crossing signals after the integrated value of the integrating circuit has exceeded a predetermined value, and yet the circuit is still capable of effecting electric power control with high accuracy.

Furthermore, the simple circuit construction contibutes not only to trouble-free operation, but to low manufacturing cost.

Referring now to FIGS. 5 to 7(G), there is shown a second embodiment of a temperature control device according to the present invention, which control device is of a type wherein electric power to be supplied to a heater of a heating apparatus is controlled by a phase control system.

Figure 5:
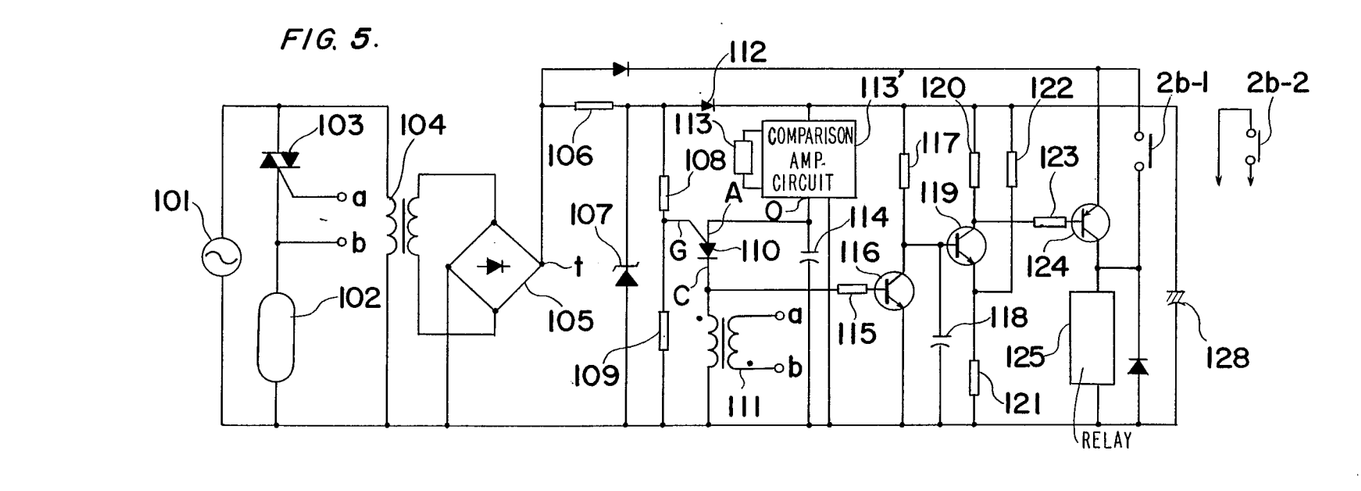
FIG. 5 is an electrical circuit diagram showing the construction of a temperature control circuit according to a second embodiment of the present invention.

Referring particularly to FIG. 5, a heater 102 provided, for example, in a heating apparatus of a fixing device (not shown) for an electrophotographic copying apparatus (not shown) is connected to an A.C. power source 101 through a triac 103 (3 electrode A.C. control element). A transformer 104 is disposed between the A.C. power source 101 and a rectifier 105 for controlling a control circuit described later at a low voltage. An output terminal t of the rectifier 105 is connected to a voltage regulator diode or Zener diode 107 through a resistor 106 for producing, across the diode 107, trapezoidal waves in the form of a truncated full wave pulsating current as shown in FIG. 7(B). Series connected resistors 108 and 109 are connected to opposite sides of the Zener diode 107 in parallel to the latter for dividing the voltage of the trapezoidal waves by the resistors 108 and 109 and for applying the same to the gate G of a programmable uni-junction transistor 110 (referred to as PUT hereinbelow) so that the phase control synchronized with the wave forms of the A.C. power source 101 can be effected. The cathode terminal c of the PUT 110 is connected to the primary side terminal of a pulse transformer 111 with the terminals a and b of the secondary side of the pulse transformer 111 being respectively connected to the gate and cathode of the triac 103.

A temperature sensor element 113, such as a thermistor, provided for detecting the temperature of the predetermined portion of the heating apparatus (not shown) is connected in parallel to a comparison amplification circuit 113' composed of a differential amplifier or bridge circuit, an output current proportional to the temperature detected by the element 113 being developed at the output terminal 0 of the circuit 113'. Connected to the output terminal 0 of the circuit 113' is a capacitor 114 which integrates the output current from the circuit 113', while the voltage across the capacitor 114 is applied to the anode A of the PUT 110. The cathode c of the PUT 110 is connected to the base of a transistor 116 through a resistor 115. A resistor 117 connected to the collector of the transistor 116 and a capacitor 118 coupled to the base of a transistor 119 at the common junction of the resistor 117 and the capacitor 118 cooperate to form a charging circuit, and every time the pulse from the PUT 110 is impressed thereon, the transistor 116 is rendered conducting for discharging the capacitor 118. The transistor 119 and resistors 120, 121 and 122 respectively connected to the collector and emitter of the transistor 119 form a circuit for comparing and detecting the potential of the above described capacitor 118, the transistor 119 being set at a predetermined constant so as to be turned off when the temperature of the fixing device (not shown) is lower than the control point, and to be rendered conducting when the temperature is raised to the control point.

The collector of the transistor 119 is connected to the base of a transistor 124 through a resistor 123, which transistor 124 amplifies the output current of the transitor 119 for driving the detecting relay 125 which has a built-in contact 2b-1 for self-holding thereof and another contact 2b-2 for generating a signal indicating that the machine is ready for a copying operation. The diode 112 connected to the output terminal t of the rectifier 105 through the resistor 106 is for preventing the influence of the smoothing capacitor 128 from effecting the trapezoidal waves developed from the Zener diode 107.

Figure 6:
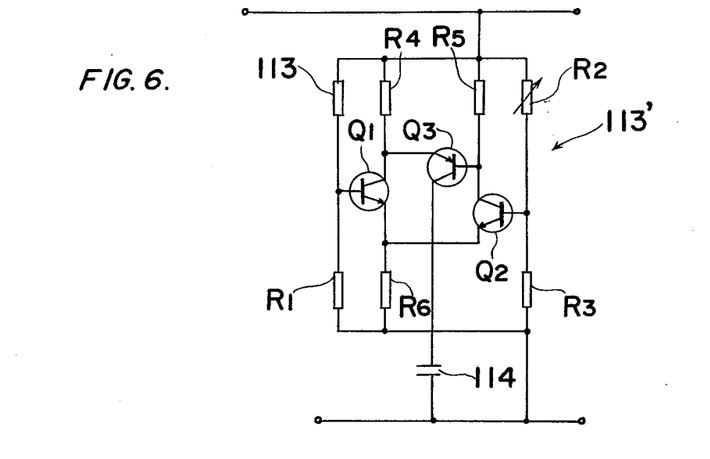
FIG. 6 is an electrical circuit diagram particularly showing a comparative amplification circuit of the embodiment of FIG. 5, FIGS. 7(A) through 7(G) illustrate wave forms and pulse intervals explanatory of the operation of the device of FIG. 5.

Referring now to FIG. 6, there is shown a circuit construction of the comparison amplification circuit 113', in which the thermistor 113 and a resistor $R_1$ connected in series with each other, and series connected resistors $R_2$ and $R_3$ form a bridge circuit, while transistors $Q_1$ and $Q_2$, and resistors $R_4$, $R_5$ and $R_6$ constitute the differential amplifier, the common junction of the thermistor 113 and the resistor $R_1$, and the resistors $R_2$ and $R_3$ being connected to the base of the transistor $Q_1$ and the base of the transistor $Q_2$ for amplifying the voltage difference at the common junctions by the differential amplifier. Output appearing at the collectors of the transistors $Q_1$ and $Q_2$ is applied to the transistor $Q_3$ as an input thereto, and the output therefrom flows into the capacitor 114 as a constant current.

In the above case, if the temperature of the heater 102 is low so that the resistance of the thermistor 113 is large, the transistor $Q_1$ is turned off, while the transistor $Q_2$ is in the conducting state, whereby a comparatively large current is supplied to the capacitor 114 with the voltage across the base and emitter of the transistor $Q_3$ being in the forward direction. When the bridge circuit approaches its equilibrium state as the resistance of the thermistor 113 decreases as the temperature rises, the collector voltages of the transistors $Q_1$ and $Q_2$ also approach the equilibrium state, by which tendency the amount of current which can be drawn from the transistor $Q_3$ is reduced, and upon reaching the equilibrium state, the transistor $Q_3$ is unable to pass any current. Similarly, when the bridge circuit is unbalanced in the reverse direction, no current is drawn from the transistor $Q_3$.

Figure 7:
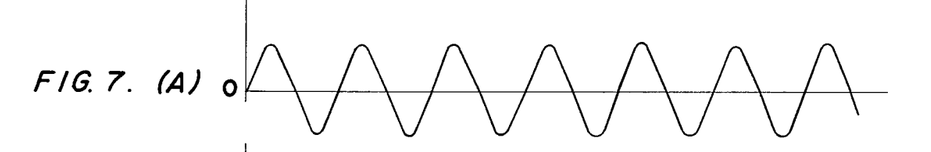

Referring also to FIGS. 7(A) to 7(G), there are shown various wave forms explanatory of the function of the device of FIG. 5, in which FIG. 7(A) shows the wave form of the A.C. power source, FIG. 7(B) that of the voltage across the Zener diode 107, FIG. 7 (C) that of the voltage across the capacitor 114, FIG. 7(D) that of voltage at the cathode terminal of the PUT 110, FIG. 7(E) that of the voltage impressed upon the heater 102 through the triac 103, and FIG. 7(F) that of the voltage across the capacitor 118, in which FIG. 7(F) voltage EA is one which renders the transistor 119 conducting, while FIG. 7(G) shows the timing according to which the relay 125 is actuated. When the temperature of the heating apparatus (not shown) is lower than the predetermined value, the output current from the comparison amplification circuit 113' is sufficiently large to cause rapid rising of the anode voltage of the PUT 110 and consequently with pulses of approximately 0.5 to 1 mm intervals being developed at the cathode c of the PUT 110, and the triac 103 is rendered conducting at the initial stage of the phase of the A.C. power source 101, thus supplying full power to the heater 102. Simultaneously, every time the pulse from the PUT 110 is applied to the transistor 116, the latter is rendered momentarily conducting for discharging the capacitor 118 while the voltage across the capacitor 118 is low. Accordingly, the transistor 119 and consequently the transistor 124 are not rendered conducting and the warming-up relay 125 remains inoperative. As the temperature of the heating apparatus is gradually raised by the heat from the heater 102 close to the predetermined value, the output current from the comparison amplification circuit 113' decreases, and the intervals between the output pulses of the PUT 110 increase and there is a consequent decrease in the number of pulses. Therefore, the angle of conduction of the triac 103 increases and causes a decrease of the heater power, and simultaneously the conducting interval of the transistor 116 is lengthened, so that the capacitor 118 is discharged after having been charged up to a higher voltage level, but not to such a high level as to render the transistor 119 conducting and the relay 125 still remains inoperative as in the case described above.

Upon a further increase of the temperature of the heating apparatus up to the predetermined level, the intervals between pulses developed from the PUT 110 further increase with a resultant decrease of the heater power and delay in conducting of the transistor 116. When the voltage of the capacitor 118, i.e., the base voltage of the transistor 119 rises above the level of the sum of the emitter voltage $V_E$ of the transistor 119 which is determined by the resistors 121 and 122, and the voltage $V_{BE}$ in the forward direction between the base and emitter of the same, the transistor 119 is rendered conducting. Accordingly, base current flows in the transistor 124 to render the same conducting for turning on the warmingup detecting relay 125, which is self-held by the normally open contact 2b-1 to complete the warmingup operation, while the other contact 2b-2 of the relay 125 is adapted to actuate a sign to indicate the machine is ready for a printing operation. The contact 2b-1 for self-holding is a type which does not re-set the relay 125 if the temperature of heating apparatus is temporarily decreased during printing after completion of the warming-up.

Referring now to FIG. 8 to FIG. 10(E), there is shown a modification of the temperature control device of FIG. 5. In this modification, a capacitor 131 and a diode 132 are connected to opposite sides of the Zener diode 107 with the common junction of the capacitor 131 and the diode 132 being connected to the base of the transistor 133, while the collector of the transistor 133 is connected to a resistor 109, and trapezoidal wave forms in the form of a truncated full wave pulsating current as shown in FIG. 9(A) are formed across the Zener diode 107. On the other hand, a differentiation circuit is formed by the capacitor 131 and the transistor 133 for producing differential pulses as shown in FIG. 9(B) at the time of the rise of the trapezoidal wave form of FIG. 9(A). It should be noted that the portions shown by dotted lines in FIG. 9(B) do not actually appear, since the said portions are cut off by the diode 132. The transistor 133 is momentarily rendered conducting by the differential pulses with the collector voltage of said transistor 133 being reduced to approximately zero, thereby developing zero crossing signals i.e., signals at the positions where A.C. waves cross the zero point, as shown in FIG. 9(C) or in FIG. 10(B) at the common junction of the series connected resistors 108 and 109 which are connected to the collector circuit of the transistor 133.

Figure 8:
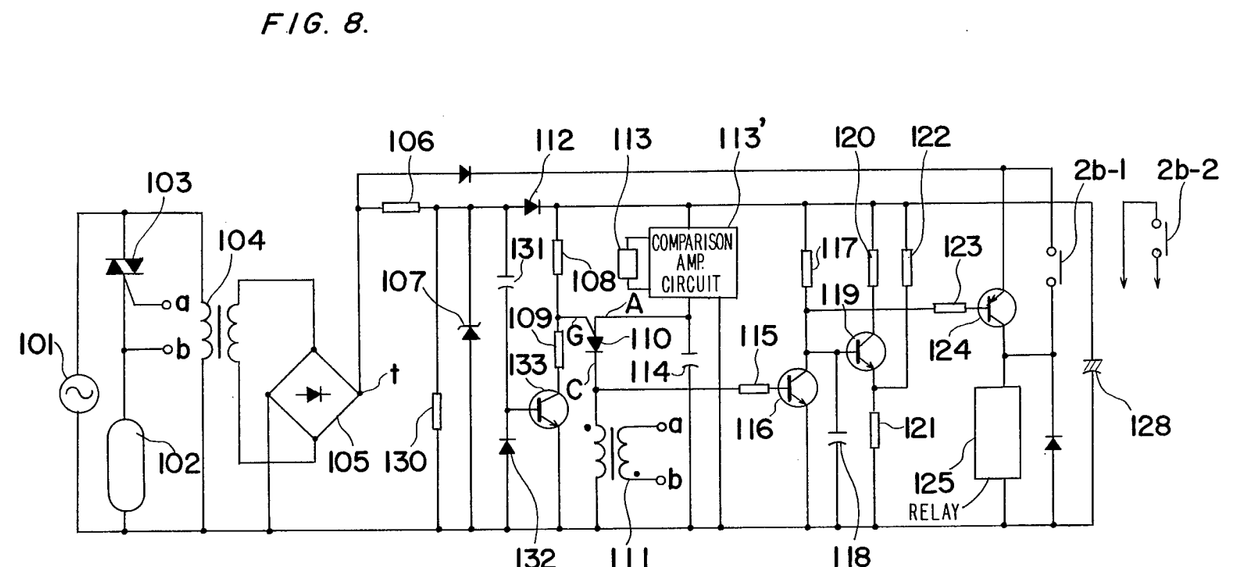
FIG. 8 is a diagram similar to FIG. 5, but particularly shows a modification thereof.
Figure 9:
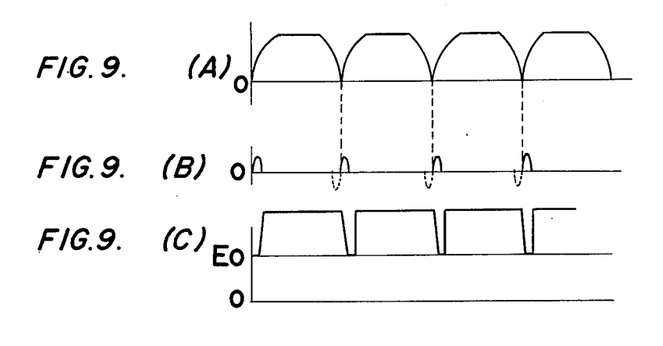
Figure 10:
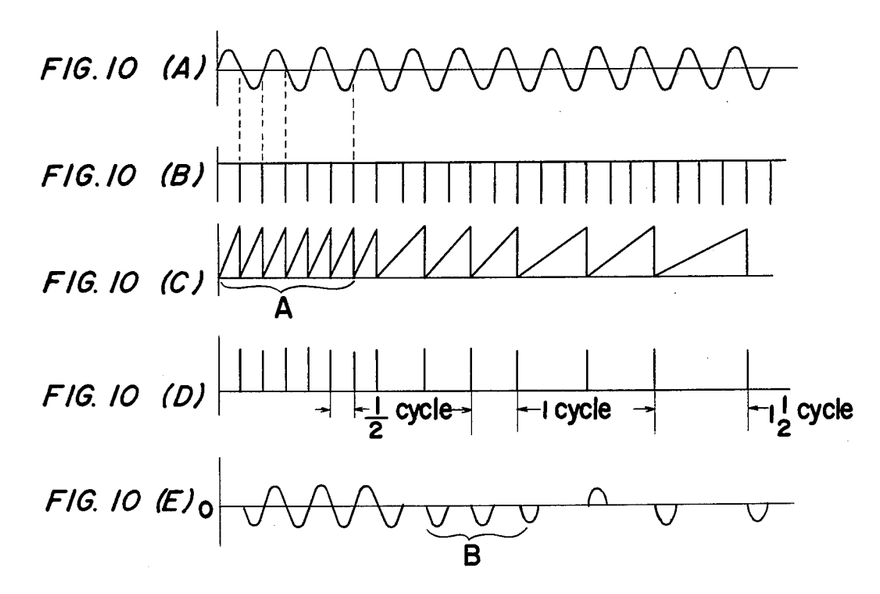

If the temperature of the heating apparatus is lower than the predetermined value, the reistance of the temperature sensor element 113 is low, while the output current of the comparison amplificaiton circuit 113' is large and the voltage across the capacitor 114 linearly increases rapidly as shown in the portion A of FIG. 10(C), which voltage is applied to the anode A of the PUT 110. When said voltage exceeds the gate voltage of the PUT 110, i.e., the value of the voltage divided by the resistors 108 and 109 with subsequent impression of the zero crossing signals on the gate G of the PUT 110, the PUT 110 oscillates, thereby causing current to flow through the pulse transformer 111, which function in turn renders the triac 103 conductive, the triac 103 thus supplying a half-cycle of the A.C. power to the heater 102, the capacitor 118 is discharged by the conduction of the PUT 110, thus again starting to be charged from a zero voltage level. The operation as described above is repeated at every half-cycle of the A.C. power, the triac 103 is turned on at every half-cycle with the heater 102 being continuously supplied with the full A.C. wave power.

As the temperature of the heating apparatus rises due to the heating of the heater 102, the resistance of the temperature sensor element 113 decreases and the charging speed of the capacitor 114 is reduced. Therefore, the voltage across the capacitor 114 can not reach the gate voltage of the PUT 110 during a half-cycle period of the A.C. power, and reaches the gate voltage, for example, before the end of a full cycle after the half-cycle has been completed.

Accordingly, even if the zero crossing signal at the initial half-cycle is applied to the PUT 110, the PUT 110 remains nonconducting, and is rendered conducting by the zero-crossing signal at the subsequent half-cycle, by which function, the triac 103 is rendered conducting as shown in the portion B of FIG. 10(E) at every full cycle and the power supplied to the heater 102 is reduced to ½ of the power in the case as described above.

As is seen from the above description, the interval between pulses developed at the cathode c of the PUT 110 increases by an interval of n/2 cycle (n is a whole number) as shown in FIG. 10(D), as the temperature of the heating apparatus rises. Whenever the pulses developed at the cathode of the PUT 110 are impressed upon the transistor 116, the latter is rendered momentarily conducting for discharging the capacitor 118. The values of the resistor 117 and the capacitor 118 are each so predetermined that the voltage of the capacitor 118 with respect to the pulse intervals developed from the PUT 110 during warming-up of the heating apparatus is higher than the sum of the emitter voltage $V_E$ and the base-emitter voltage $V_{BE}$ of the transistor 119.

When the temperature of the heating apparatus reaches the predetermined level, the length of the intervals between the pulses increase with a simultaneous increase of the conducting intervals of the transistor 116 and cause an increased voltage across the capacitor 118, thus turning the transistor 119 on, in which case, the relay 125 is energized for indication of the completion of the warming-up.

As is clear from the foregoing description, in each of the temperature control devices of FIGS. 5 and 8 of the invention, since the signal for the completion of the warming-up is obtained through detection of the intervals between the pulses for controlling the power to be supplied to the electric heaters or the like in the heating apparatus, temperature sensor elements for detecting the completion of the warming-up can be eliminated with consequent reduction in manufacturing cost.

Furthermore, such inaccurate functioning inherent in the conventional temperature control devices which indicate that the heating apparatuses have not reached the predetermined temperature despite the development of the warming-up completion signals can advantageously be prevented. Since other functions and construction of the circuit of FIG. 8 are similar to those in the embodiment of FIG. 5, description thereof is abbreviated for brevity.

It should be noted here that the application of the temperature control device of the invention is not limited to control of the temperature of the heater of the fixing device for use in an electrophotographic copying apparatus, but may be applied to controlling of the temperature of various heat sources.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. A temperature control device for controlling the temperature of a portion to be heated by a heating element to which electric power is supplied, the device comprising:

a pulse generating means for generating pulses with the intervals between the pulses varying in accordance with the temperature of the portion to be heated by the heating element, a switching means coupled to said pulse generating means for being supplied with the pulses from said pulse generating means and for controlling the electric power supplied to the heating element in accordance with the pulse intervals, and a sensing means coupled to said pulse generating means for sensing a specific pulse interval at which the temperature of the portion to be heated has reached a predetermined level and upon sensing said specific interval, said sensing means generating a signal indicative of completion of warming-up of the portion to be heated as its temperature reaches the predetermined level.

2. The temperature control device as claimed in claim 1 wherein said sensing means includes a charging circuit having a condenser, a first transistor connected to said pulse generating means and to said charging circuit, and a second transistor connected to said condenser, said first transistor discharging said condenser upon becoming conductive and said condenser being adapted to make said second transistor conductive when the temperature of the portion to be heated reaches the predetermined level, thereby providing an indication of the completion of warming-up.

3. A temperature control device for controlling the temperature of a portion to be heated by a heating element to which electric power is supplied, the device comprising:

a detecting element for detecting the temperature of the portion to be heated, a pulse generating means including a comparison amplification control circuit associated with said detecting element for supplying to the output terminal thereof an output current proportional to the temperature detected by said detecting element, a programmable uni-junction transistor, a condenser connected to the output terminal of said comparison amplification circuit and connected to the anode of programmable uni-junction transistor for applying the terminal voltage of said condenser to the anode of said programmable uni-junction transistor, and a pulse transformer connected to the cathode of said programmable uni-junction transistor for generating pulses with the pulse intervals varying in accordance with the temperature detected by said detecting element, a switching means including a triac connected to said pulse transformer for being supplied with the pulses, said triac being adapted to be connected with the heating element so that the electric power to be supplied to said heating element is controlled in accordance with the pulse intervals, and a sensing means for sensing specific pulse intervals at which the temperature of the portion to be heated has reached a predetermined level and including a first transistor the base of which is connected to the cathode of said programmable uni-junction transistor, a charging circuit having at least a condenser connected to the collector of said first transistor, and a comparison detection circuit having at least a second transistor and to which said charging circuit is connected, said first transistor being made conductive upon application of pulses thereto from said programmable uni-junction transistor for discharging charges in said condenser and said second transistor being made conductive by said condenser when the temperature of the portion to be heated reaches the predetermined level, and thereby indicating the completion of warming-up.

4. The temperature control device as claimed in claim 3 wherein said sensing means further includes a third transistor connected to said second transistor and a relay connected to said third transistor, said third transistor being for driving said relay when said second transistor becomes conductive, and said relay generating a signal indicative of completion of warming-up of the portion to be heated.

5. A temperature control device for detecting zero crossing points of an A.C. power source and for generating pulse signals at zero crossing times of the A.C. power source, for integrating a control input voltage and for producing an output of zero crossing signals after the integrated value of said control input voltage has exceeded a predetermined value, said temperature control device comprising a switching element for passing a half cycle of the A.C. power source to a heating element, a rectifier coupled to the A.C. power source, a Zener diode, an output terminal of said rectifier being connected to said Zener diode for developing trapezoidal form waves of rectified full waves across said Zener diode, a first capacitor and a diode connected to each other in series and connected to opposite sides of said Zener diode, a first transistor, the common junction of said first capacitor and said diode being connected to the base of said first transistor with said first capacitor and said first transistor forming a differential circuit so as to develop differential pulses at the base of said first transistor upon the rise of said trapezoidal form waves, series-connected resistors connected to the collector of said first transistor for developing zero crossing signals at a common junction of said series-connected resistors upon momentary conduction of said first transistor due to said differential pulses and for determining a comparison voltage, a programmable uni-junction transistor, to which said common junction of said series-connected resistors is connected, a pulse transformer to the primary winding of which the cathode of said programmable uni-junction transistor is connected for developing pulses for turning on said switch element and the secondary winding of said pulse transformer being connected to the control terminals of said switching element, a temperature sensor element disposed in the vicinity of said heating element for detecting the temperature of a heating apparatus to be heated by said heating element, one terminal of said temperature sensor element being connected to an output terminal of said rectifier, a second transistor, the other terminal of the temperature sensor element being connected to the base of said second transistor, a third transistor and a plurality of resistors connected to the collector and emitter of said second transistor and the collector of said third transistor to form with said second transistor a differential amplifier, a further plurality of resistors connected between the other terminal of said temperature sensor element and another terminal of said rectifier, series-connected resistors connected, at a common junction thereof, to the base of said third transistor for biasing said third transistor, a fourth transistor for a constant current source having the emitter thereof connected to the collector of said second transistor and the base thereof connected to the collector of said third transistor for receiving the output of said differential amplifier with the collector of said fourth transistor being connected to the anode of said programmable uni-junction transistor, a second capacitor for integration and to which the collector of said fourth capacitor is connected, and a smoothing capacitor coupled to said rectifier.

6. A temperature control device as claimed in claim 5, wherein said switching element is a three electrode A.C. control element.

7. A temperature control device as claimed in claim 6, wherein said three electrode A.C. control element is a triac.

8. A temperature control device as claimed in claim 5, wherein said temperature sensor element is a thermistor.

9. In a temperature control device in which electric power to be supplied to a heating element is controlled corresponding to pulse invervals applied to a switching element with the pulse intervals adapted to vary according to the temperature of a portion to be heated by the heating element, and in which a temperature sensor element is provided to detect the pulse intervals when the temperature of said portion to be heated has reached a predetermined level with the signal from said sensor element being utilized as signal for completion of warming-up of said portion to be heated, a temperature control circuit comprising said switching element which is coupled between an A.C. power source and said heating element, a transformer, a rectifier coupled to the A.C. power source through said transformer, a Zener diode, said rectifier having an output terminal connected to said Zener diode for developing trapezoidal form waves of rectified full waves across said Zener diode, series-connected resistors coupled to opposite sides of said Zener diode, a programmable uni-junction transistor, the common junction of said series-connected resistors being connected to the gate of said programmable uni-junction transistor for dividing the voltage of said trapezoidal form waves and for applying the same to said gate to enable phase control synchronized with the wave forms of the A.C. power source, a pulse transformer having the primary winding connected to the cathode of said programmable uni-junction transistor and the secondary winding of said pulse transformer being connected to the control terminals of said switching element, a comparison amplification control circuit connected between said output terminal of said rectifier and the anode of said programmable uni-junction transistor, said temperature sensor element being connected in parallel to said comparison amplification control circuit, a first capacitor connected to an output terminal of said comparison amplification control circuit and to the anode of said programmable uni-junction transistor for integrating output current from said comparison amplification control circuit and applying the voltage across said first capacitor to the anode of said programmable uni-junction transistor, a first transistor having the base connected to the cathode of said programmable uni-junction transistor, a charging circuit composed of a series connected resistor and a second capacitor, a second transistor, the common junction of said resistor and said second capacitor being connected to the collector of said first transistor and the base of said second transistor for rendering said first transistor conducting whenever a pulse from said programmable uni-junction transistor is applied to said first transistor so as to discharge said second capacitor, a plurality of resistors connected to said second transistor for forming a comparison and detecting circuit for comparing and detecting the potential of said second capacitor, a third transistor, to which the collector of said second transistor is connected, a warming-up completion detection relay coupled to said third transistor for being driven thereby by amplification of the output current from said second transistor, said relay having a self-holding contact and another contact for generating a signal, and a smoothing capacitor coupled to said rectifier.

10. A temperature control device as claimed in 9, wherein said switching element is a three electrode A.C. control element.

11. A temperature control device as claimed in claim 10, wherein said three electrode A.C. control element is a triac.

12. A temperature control device as claimed in claim 9, wherein said temperature sensor element is a thermistor.

13. A temperature control device as claimed in claim 9, wherein said comparison amplification control circuit further comprises a bridge circuit composed of said temperature sensor element and three resistors connected in series thereto, and a comparison amplifier composed of a fourth and fifth transistors and a plurality of resistors, voltage at a common junction of said sensor element and one of said three resistors being applied to the base of said fourth transistor with voltage at a common junction of the other two of said three resistors being applied to the base of said fifth transistor for amplifying difference of said voltages in said comparison amplifier, and a sixth transistor to which said difference of said voltages is applied as an input thereto, which input is in turn applied to said first capacitor as a constant current.

14. A temperature control device as claimed in claim 9, wherein said temperature control circuit further comprises a third capacitor and a diode connected in series with each other, said third capacitor and diode being connected to opposite sides of said Zener diode, a seventh transistor to the base of which is connected the common junction of said third capacitor and said diode, the collector of said seventh transistor being connected to one end of said series-connected resistors coupled to said Zener diode with the emitter of said seventh diode.

* * * * *